(12) United States Patent
Lei (10) Patent No.: US 12,187,307 B2
(45) Date of Patent: Jan. 7, 2025

(54) VEHICLE COMMUNICATION METHOD AND APPARATUS, COMPUTER-READABLE STORAGE MEDIUM, AND ELECTRONIC DEVICE

(71) Applicant: TENCENT TECHNOLOGY (SHENZHEN) COMPANY LIMITED, Guangdong (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 285 days.

(21) Appl. No.: 17/685,866

(22) Filed: Mar. 3, 2022

(65) Prior Publication Data

US 2022/0185311 A1  Jun. 16, 2022

Related U.S. Application Data

(63) Continuation of application No. PCT/CN2021/075740, filed on Feb. 7, 2021.

(30) Foreign Application Priority Data

Apr. 3, 2020 (CN) .......................... 202010260884.X (51) Int. Cl.
*B60W 50/14* (2020.01)
*B60W 30/08* (2012.01)
(Continued)

(52) U.S. Cl.
CPC ............ *B60W 50/14* (2013.01); *B60W 30/08* (2013.01); *B60W 40/105* (2013.01); *G06F 18/25* (2023.01);
(Continued)

(58) Field of Classification Search
CPC .... B60W 50/14; B60W 30/08; B60W 40/105; B60W 2554/4049; B60W 2050/146; H04W 4/40; G06F 18/25
See application file for complete search history.

(56) References Cited

U.S. PATENT DOCUMENTS

| 8,793,063 | B2 * | 7/2014 | Horvitz | ................ G08G 1/0104 |
|---|---|---|---|---|
| | | | | 701/119 |
| 11,679,781 | B2 * | 6/2023 | Kim | .................... G01C 21/3889 |
| | | | | 701/25 |

(Continued)

FOREIGN PATENT DOCUMENTS

| CN | 107613527 A | 1/2018 |
|---|---|---|
| CN | 108200552 A | 6/2018 |

(Continued)

OTHER PUBLICATIONS

CN-110475225 Translation (Year: 2019).*

(Continued)

*Primary Examiner* — Aniss Chad
*Assistant Examiner* — Christopher George Fees
(74) *Attorney, Agent, or Firm* — Sughrue Mion, PLLC (57) ABSTRACT

A vehicle communication method and apparatus, a computer-readable medium, and an electronic device. The vehicle communication method includes: obtaining location information and state information of a plurality of objects participating in Internet of Vehicles communication; determining, according to the location information and the state information of the plurality of objects, Internet of Vehicles information that needs to be transmitted to a specified object; determining an information fusion and compression policy for the specified object based on at least one of the Internet of Vehicles information and state information of the specified object; and transmitting the Internet of Vehicles (Continued)

information to the specified object based on the information fusion and compression policy.

16 Claims, 5 Drawing Sheets

(51) Int. Cl.
    *B60W 40/105*     (2012.01)
    *G06F 18/25*     (2023.01)
    *H04W 4/40*     (2018.01)

(52) U.S. Cl.
    CPC ........ *H04W 4/40* (2018.02); *B60W 2050/146* (2013.01); *B60W 2554/4049* (2020.02)

(56) References Cited

U.S. PATENT DOCUMENTS

| | | | | |
|---|---|---|---|---|
| 11,706,623 B2 * | 7/2023 | Liu | ........................ | H04W 4/40 455/411 |
| 11,842,585 B2 * | 12/2023 | Bang | ..................... | G07C 5/085 |
| 2018/0174449 A1 * | 6/2018 | Nguyen | ................. | G08G 1/015 |
| 2018/0204458 A1 * | 7/2018 | Fairfield | .......... | G08G 1/096725 |
| 2018/0208195 A1 * | 7/2018 | Hutcheson | ............. | G08G 1/162 |
| 2019/0096238 A1 * | 3/2019 | Ran | ........................ | G08G 1/164 |
| 2019/0322281 A1 | 10/2019 | Wang | | |
| 2020/0201353 A1 * | 6/2020 | Martin | ............... | G01C 21/3697 |
| 2021/0204188 A1 * | 7/2021 | Oyama | ................. | H04W 36/14 |
| 2022/0201779 A1 * | 6/2022 | Nakamura | .............. | H04W 4/46 |

FOREIGN PATENT DOCUMENTS

| | | | | |
|---|---|---|---|---|
| CN | 110415543 A | | 11/2019 | |
| CN | 110475225 A | * | 11/2019 | ............. H04W 4/06 |
| CN | 110719570 A | | 1/2020 | |
| CN | 111586557 A | | 8/2020 | |

OTHER PUBLICATIONS

International Search Report for PCT/CN2021/075740 dated Apr. 29, 2021.
Written Opinion for PCT/CN2021/075740 dated Apr. 29, 2021.

* cited by examiner

VEHICLE COMMUNICATION METHOD AND APPARATUS, COMPUTER-READABLE STORAGE MEDIUM, AND ELECTRONIC DEVICE

CROSS-REFERENCE TO RELATED APPLICATION(S)

This application is a continuation application of International Application No. PCT/CN2021/075740 filed on Feb. 7, 2021, which claims priority to Chinese Patent Application No. 202010260884.X, filed with the China National Intellectual Property Administration on Apr. 3, 2020, the disclosures of which are incorporated by reference in their entireties.

FIELD

The disclosure relates to the field of communication technologies, and specifically, to a vehicle communication method and apparatus, a computer-readable storage medium, and an electronic device.

BACKGROUND

Vehicle to everything (V2X) communication is to provide vehicle information through sensors and on-board terminals mounted on a vehicle, and implement mutual communication of vehicle to vehicle (V2V), vehicle to infrastructure (V2I), vehicle to pedestrian (V2P), and vehicle to network (V2N).

Existing V2X application layer message sets are made by countries around the world based on local traffic management systems and rules as well as classification and emphasis on scenarios, and various application scenarios in which safety reminders and driving assistance are required for vehicles of different driving classes and drivers exist in these message sets. However, how to transmit such safety reminder information and driving assistance information to a terminal is a technical problem to be resolved.

SUMMARY

Embodiments of the disclosure provide a vehicle communication method and apparatus, a computer-readable medium, and an electronic device, to avoid transmitting excessive driving assistance information and safety reminder information excessively frequently at least to some extent, which helps achieve energy saving of the electronic device.

Other features and advantages of the disclosure become obvious through the folioing detailed descriptions, or may be partially learned through the practice of the disclosure.

According to an aspect of the embodiments of the disclosure, a vehicle communication method is provided, performed by an electronic device, the method including: obtaining location information and state information of a plurality of objects participating in Internet of Vehicles communication; determining, according to the location information and the state information of the plurality of objects, Internet of Vehicles information that needs to be transmitted to a specified object; determining an information fusion and compression policy for the specified object based on at least one of the Internet of Vehicles information and state information of the specified object; and transmitting the Internet of Vehicles information to the specified object based on the information fusion and compression policy.

According to an aspect of the embodiments of the disclosure, a vehicle communication method may be provided, performed by an electronic device, the method including: receiving Internet of Vehicles information transmitted by another device; determining an information fusion and compression policy based on at least one of the Internet of Vehicles information and state information of the electronic device; and displaying the Internet of Vehicles information based on the information fusion and compression policy.

According to an aspect of the embodiments of the disclosure, a vehicle communication apparatus may be provided, including: at least one memory configured to store program code; and at least one processor configured to read the program code and operate as instructed by the program code, the program code comprising: obtaining code configured to cause the at least one processor to obtain location information and state information of a plurality of objects participating in Internet of Vehicles communication; first processing code configured to cause the at least one processor to determine, according to the location information and the state information of the plurality of objects, Internet of Vehicles information that needs to be transmitted to a specified object; a second processing unit, configured to determine an information fusion and compression policy for the specified object based on at least one of the Internet of Vehicles information and state information of the specified object; and transmission code configured to cause the at least one processor to transmit the Internet of Vehicles information to the specified object based on the information fusion and compression policy.

According to an aspect of the embodiments of the disclosure, a vehicle communication apparatus may be provided, further including: receiving code configured to cause the at least one processor to receive Internet of Vehicles information transmitted by another device; third processing code configured to cause the at least one processor to determine an information fusion and compression policy based on at least one of the Internet of Vehicles information and state information of an electronic device; and fourth processing code configured to cause the at least one processor to display the Internet of Vehicles information based on the information fusion and compression policy.

According to an aspect of the embodiments of the disclosure, a computer-readable medium may be provided, storing a computer program code that when executed by at least one processor, implementing the vehicle communication method according to the foregoing embodiments.

According to an aspect of the embodiments of the disclosure, an electronic device may be provided, including: one or more processors; and a storage apparatus, configured to store one or more programs, the one or more programs, when executed by the one or more processors, causing the one or more processors to implement the vehicle communication method according to the foregoing embodiments.

According to an aspect of the embodiments of the disclosure, a computer program product or a computer program may be provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing vehicle communication method.

It is to be understood that, the foregoing general descriptions and the following detailed descriptions are merely for illustration and explanation purposes and are not intended to limit the disclosure.

BRIEF DESCRIPTION OF THE DRAWINGS

Accompanying drawings herein are incorporated into a specification and constitute a part of this specification, show embodiments that conform to the disclosure, and are used for describing a principle of the disclosure together with this specification. The accompanying drawings in the following descriptions are merely some embodiments of the disclosure, and a person of ordinary skill in the art may further obtain other accompanying drawings according to the accompanying drawings without creative efforts. In addition, one of ordinary skill would understand that aspects of example embodiments may be combined together or implemented alone. In the accompanying drawings.

DESCRIPTION OF EMBODIMENTS

To make objectives, technical solutions, and advantages of the embodiments of the disclosure clearer, the following further describes in detail embodiments of the disclosure with reference to the accompanying drawings. The described embodiments are not to be construed as a limitation to the present disclosure. All other embodiments obtained by a person of ordinary skill in the art without creative efforts shall fall within the protection scope of the present disclosure.

In addition, the described features, structures or characteristics may be combined in one or more embodiments in any appropriate manner. In the following descriptions, a lot of specific details are provided to give a comprehensive understanding of the embodiments of the disclosure. However, a person skilled in the art is to be aware that, the technical solutions in the disclosure may be implemented without one or more of the particular details, or another method, unit, apparatus, or operation may be used. In other cases, well-known methods, apparatuses, embodiments, or operations are not shown or described in detail, to avoid obscuring the aspects of the disclosure.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
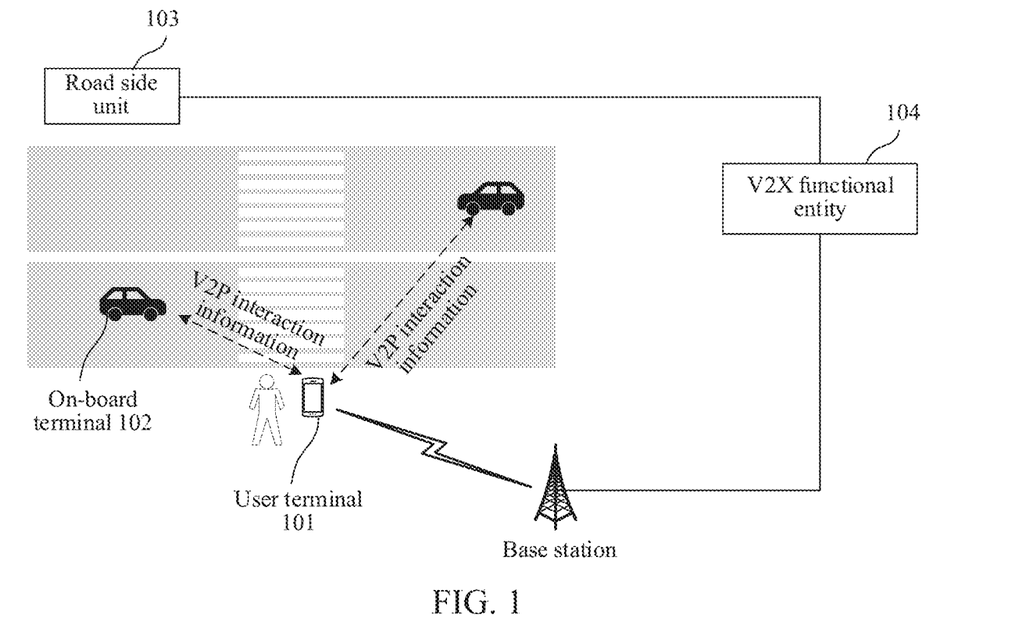
FIG. 1 is a schematic diagram of an exemplary system architecture to which technical solutions according to the embodiments of the disclosure are applicable.

FIG. 1 is a schematic diagram of an exemplary system architecture to which technical solutions according to the embodiments of the disclosure are applicable.

As shown in FIG. 1. the system architecture is a V2X communication architecture, which includes a user terminal 101. an on-board terminal 102. a road side unit 103. and a V2X functional entity 104. The V2X functional entity 104 may be deployed in a cloud (that is, a central cloud) or a network edge (that is, an edge cloud), and a function implemented by the V2X functional entity 104 may also be implemented in a V2X application server or another network element. For example, in a fifth generation (5G) network, a function implemented by the V2X functional entity 104 may be implemented by an application function (AF) entity or implemented by a policy control function (PGF) entity.

The user terminal 101 may be a smartphone, a wearable device, a tablet computer, or the like. The user terminal 101 may transmit Internet of Vehicles information (for example, the Internet of Vehicles information transmitted to a certain user terminal or on-board terminal), state information, location information and the like to the V2X functional entity 104 through a base station. The road side unit 103 may transmit the acquired location information and state information of objects (for example, a vehicle, a pedestrian, and an animal) in a surrounding region to the V2X functional entity 104.

The on-board terminal 102 may be an on-board unit (OBU), a Telematics BOX (T-box, which is an on-board network terminal) and its upper computer, or another device. On one hand, the on-board terminal 102 may perform end-to-end interaction with the user terminal 101 to transmit V2P interaction information. On the other hand, the on-board terminal 102 can further transmit location information and state information, as well as the acquired location information and state information of the objects in the surrounding region (for example, information acquired by a driving recorder, a radar, or the like) to the V2X functional entity 104.

In an embodiment of the disclosure, the road side unit 103 may communicate with the V2X functional entity 104 through a fourth generation (4G) network, a 5G network, a beyond fifth generation mobile communication system (B5G) network, or a wired network. The user terminal 101 may also communicate with the V2X functional entity 104 through a 4G network, a 5G network, or a B5G network.

In an embodiment of the disclosure, the V2X functional entity 104 may obtain location information and state information of a plurality of objects (for example, a vehicle, a pedestrian, and other objects on a road) participating in Internet of Vehicles communication, then determine, according to the location information and the state information of the plurality of objects, Internet of Vehicles information that needs to be transmitted to a specified object (for example, a certain user terminal or on-board terminal), further determine an information fusion and compression policy for the specified object based on at least one of the Internet of Vehicles information that needs to be transmitted to the specified object and state information of the specified object, and then transmit the Internet of Vehicles information to the specified object based on the information fusion and compression policy. The technical solution of this embodiment can avoid transmitting excessive driving assistance information and safety reminder information excessively frequently to the specified object, avoiding unnecessary interruption to the user, and can also reduce excessive power consumption of the terminal device, which helps achieve energy saving of the terminal device.

In an embodiment of the disclosure, after the terminal device (for example, a user terminal or an on-board terminal) receives Internet of Vehicles information transmitted by another device (for example, a V2X functional entity, another on-board terminal, or a user terminal), the terminal device may determine information fusion and compression policy based on at least one of the received Internet of Vehicles information and state information of the terminal device, and then display the received Internet of Vehicles information based on the information fusion and compression policy. The technical solution of this embodiment enables the terminal device to perform fusion and compression on the Internet of Vehicles information that needs to be displayed, thereby avoiding displaying excessive driving assistance information and safety reminder information, avoiding unnecessary interruption to the user, and can also reduce excessive power consumption of the terminal device, which helps achieve energy saving of the terminal device.

Figure 2:
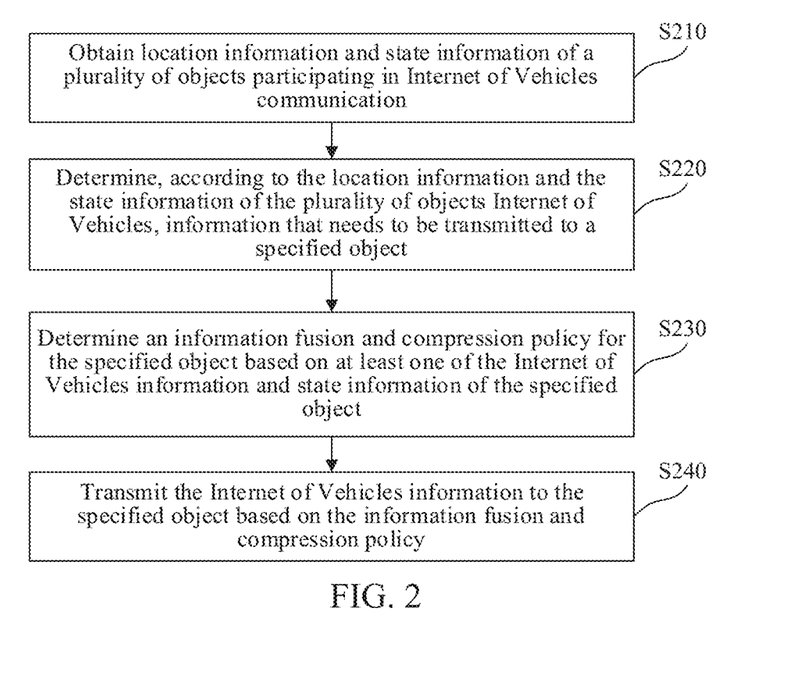
FIG. 2 is a flowchart of a vehicle communication method according to an embodiment of the disclosure.

The embodiment details of the technical solution of this embodiment of the disclosure are described in detail as follows:

FIG. 2 is a flowchart of a vehicle communication method according to an embodiment of the disclosure. The vehicle communication method may be performed by an electronic device. For example, the electronic device is a V2X functional entity, and the V2X functional entity may be deployed in a central cloud or an edge cloud, for example, the V2X functional entity 104 in FIG. 1. Referring to FIG. 2, the vehicle communication method includes at least operation S210 to operation S240, which are described in detail as follows:

In operation S210, location information and state information of a plurality of objects participating in Internet of Vehicles communication are obtained.

In an embodiment of the disclosure, the plurality of objects participating in the Internet of Vehicles communication may include a vehicle, a pedestrian, and other objects on a road. The location information of the object may be absolute location information of the object, for example, global positioning system (GPS) coordinates of the object; and the location information of the object may alternatively be relative location information of one object relative to another reference object, for example, a distance of one vehicle relative to another vehicle. The state information of the object may include a static or moving state and a movement speed of the object.

In an embodiment of the disclosure, the V2X functional entity can obtain location information and state information transmitted by a plurality of terminal devices. For example, the terminal devices (a user terminal, an on-board terminal, and the like) transmits the location information and the state information to the V2X functional entity.

In an embodiment of the disclosure, the V2X functional entity can also obtain location information and state information of other objects sensed by a plurality of terminal devices. For example, an on-board terminal and monitoring devices disposed on both sides of a road can acquire location information and state information of other surrounding objects by cameras, and then transmit the acquired location information and state information to the V2X functional entity.

In an embodiment of the disclosure, the V2X functional entity can further obtain location information and state information of objects acquired by a plurality of road side units. For example, a road side unit (RSU) can acquire location information and state information of an object located in a certain region of a road, and then transmit the acquired location information and state information to the V2X functional entity.

In operation S220, Internet of Vehicles information that needs to be transmitted to a specified object is determined according to the location information and the state information of the plurality of objects.

In an embodiment of the disclosure, after obtaining the location information and the state information of the plurality of objects, the V2X functional entity can determine, based on the location information and the state information of the plurality of objects, the object to which the Internet of Vehicles information is transmitted. For example, if the V2X functional entity determines, according to the obtained information, that a pedestrian is about to cross a road, it can be determined that the V2X functional entity needs to transmit reminder information to vehicles that are about to pass the road section to slow down, and transmit safety reminder information to the pedestrian who is about to cross the road. In another example, if the V2X functional entity finds, according to the obtained information, that a certain road section is relatively congested, it can be determined that the V2X functional entity needs to transmit reminder information of road section congestion to vehicles whose planned route includes the road section. In another example, if the V2X functional entity finds, according to the obtained information, that a certain vehicle brakes sharply, it can be determined that the V2X functional entity needs to transmit warning information to other vehicles driving behind the vehicle to remind these vehicles that a vehicle brakes sharply in front.

Still referring to FIG. 2, in operation S230, an information fusion and compression policy for the specified object is determined based on at least one of the Internet of Vehicles information and state information of the specified object.

In an embodiment of the disclosure, the information fusion and compression policy for the specified object can be determined according to the state information of the specified object. For example, a movement speed of the specified object can be determined according to the state information of the specified object, and then a frequency of transmitting the Internet of Vehicles information to the specified object can be determined based on the movement speed of the specified object. Specifically, the frequency is positively correlated with the movement speed of the specified object.

If the movement speed of the specified object is lower, a location relationship between the specified object and other surrounding objects changes more slowly. Therefore, the frequency of transmitting the Internet of Vehicles information to the specified object can be appropriately reduced to avoid transmitting the Internet of Vehicles information excessively frequently to cause interruption to the user and increase power consumption of the terminal. On the contrary, if the movement speed of the specified object is higher, the location relationship between the specified object and other surrounding objects changes more quickly. Therefore, to ensure safety and provide driving assistance information in time, the frequency of transmitting the Internet of Vehicles information to the specified object can be higher.

In an embodiment of the disclosure, the information fusion and compression policy for the specified object can be determined according to the Internet of Vehicles information transmitted to the specified object and the state information of the specified object. For example, the movement speed of the specified object can be determined according to the state information of the specified object. If the movement speed of the specified object is relatively low, a frequency of transmitting other Internet of Vehicles information than safety-related Internet of Vehicles information can be reduced, but it is still ensured that a frequency of transmitting the safety-related Internet of Vehicles information to the specified object is relatively high. If the movement speed of the specified object is relatively high, the frequency of transmitting the Internet of Vehicles information to the specified object can be increased. Certainly, an upper limit of the transmission frequency can be set to ensure that the maximum transmission frequency does not exceed the upper limit.

In an embodiment of the disclosure, the information fusion and compression policy for the specified object can be determined according to the state information and location information of the specified object. For example, the movement speed of the specified object can be determined according to the state information of the specified object. In a case that it is determined, according to the location information of the specified object, that the specified object is on a certain road section, the frequency of transmitting the Internet of Vehicles information to the specified object can be reduced when the movement speed of the specified object is relatively low. In this embodiment, due to a relatively large volume of vehicles or pedestrians on certain road sections, even if the movement speed of the specified object is relatively low, to ensure safety and timeliness of driving assistance information, the frequency of transmitting the Internet of Vehicles information to the specified object cannot be reduced. Therefore, in a case that the specified object is on a certain road section, the frequency of transmitting the Internet of Vehicles information to the specified object can be reduced when the movement speed of the specified object is relatively low.

In an embodiment of the disclosure, the information fusion and compression policy for the specified object may be determined according to the Internet of Vehicles information that needs to be transmitted to the specified object and the state information and the location information of the specified object. For example, transmitting other Internet of Vehicles information than safety-related Internet of Vehicles information to the specified object is stopped in a case that it is determined, according to the movement speed of the specified object and the location information of the specified object, that the specified object is in a static state at a target location. For example, if a certain vehicle (that is, the specified object is a vehicle) is parked next to a safe road, transmitting the Internet of Vehicles information such as the driving assistance information to the vehicle can be stopped. However, for the sake of safety, the safety-related Internet of Vehicles information, for example, information such as a distance between another vehicle or a pedestrian and the vehicle, and whether there is a security threat, can still be transmitted to the vehicle.

In an embodiment of the disclosure, after transmitting other Internet of Vehicles information than the safety-related Internet of Vehicles information to the specified object is stopped, the other Internet of Vehicles information is resumed to be transmitted to the specified object in a case that it is determined, according to the movement speed of the specified object and the location information of the specified object, that the specified object starts to move from the static state. The technical solution of this embodiment makes it possible to resume transmitting the other Internet of Vehicles information to the vehicle after the vehicle continues to move, to assist the vehicle in sale driving.

In an embodiment of the disclosure, the information fusion and compression policy for the specified object can be determined according to the Internet of Vehicles information that needs to be transmitted to the specified object. For example, in a case that it is determined, according to the Internet of Vehicles information, that there are a plurality of pieces of identical Internet of Vehicles information within a predetermined duration, a predetermined quantity of pieces of the Internet of Vehicles information is filtered out from the plurality of pieces of identical Internet of Vehicles information. The technical solution of this embodiment can avoid transmitting excessive identical Internet of Vehicles information to cause interruption to the user and power consumption of the terminal device.

In an embodiment of the disclosure, the information fusion and compression policy for the specified object may alternatively be adjusted through at least one of the following information: a user portrait corresponding to the specified object, approval information fed back by the specified object for the Internet of Vehicles information transmitted to the specified object, and importance of the Internet of Vehicles information transmitted to the specified object.

Specifically, for example, if it is determined, according to the user portrait corresponding to the specified object, that the user corresponding to the specified object is an experienced driver with better driving skills, transmitting certain driving assistance information can be stopped, or the frequency of transmitting these driving assistance information can be reduced. If it is determined, according to the user portrait corresponding to the specified object, that the user corresponding to the specified object is an unskilled driver, the frequency of transmitting the driving assistance information can be increased, and the information fusion and compression policy for the specified object can be adjusted accordingly.

If it is determined, according to the approval information fed back by the specified object for the Internet of Vehicles information transmitted to the specified object, that the user corresponding to the specified object does not pay attention to a certain type of Internet of Vehicles information, transmitting the type of Internet of Vehicles information can be stopped, or the frequency of transmitting the type of Internet of Vehicles information can be reduced; and if it is determined, according to the approval information fed back by the specified object for the Internet of Vehicles information transmitted to the specified object, that the user corresponding to the specified object is interested in a certain type of Internet of Vehicles information, the frequency of transmitting the type of Internet of Vehicles information can be increased.

If importance of certain Internet of Vehicles information is determined to be of high level according to the importance of the Internet of Vehicles information transmitted to the specified object, the frequency of transmitting these Internet of Vehicles information can be increased, or these Internet of Vehicles information can be pushed first.

Still referring to FIG. 2, in operation S240, the Internet of Vehicles information is transmitted to the specified object based on the information fusion and compression policy.

In an embodiment of the disclosure, as described in the foregoing embodiment, if the frequency of transmitting the Internet of Vehicles information needs to be reduced, transmitting the Internet of Vehicles information to the specified object based on the information fusion and compression policy is reducing the frequency of transmitting the Internet of Vehicles information to the specified object. If the frequency of transmitting the Internet of Vehicles information needs to be increased, transmitting the Internet of Vehicles information to the specified object based on the information fusion and compression policy is increasing the frequency of transmitting the Internet of Vehicles information to the specified object. If transmitting certain Internet of Vehicles information needs to be stopped, transmitting the Internet of Vehicles information to the specified object based on the information fusion and compression policy is not transmitting these Internet of Vehicles information to the specified object. If the Internet of Vehicles information needs to be filtered, transmitting the Internet of Vehicles information to the specified object based on the information fusion and compression policy is transmitting the filtered Internet of Vehicles information to the specified object.

In the technical solution of this embodiment shown in FIG. 2 can properly adjust the information fusion and compression policy for the specified object, thereby avoiding transmitting excessively driving assistance information and safety reminder information frequently to the specified object, avoiding unnecessary interruption to the user, and can also reduce excessive power consumption of the terminal device, which helps achieve energy saving of the terminal device.

Figure 3:
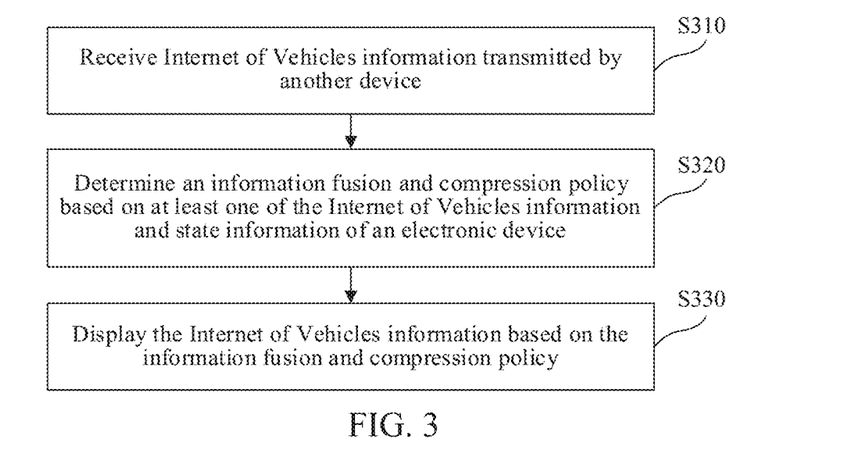
FIG. 3 is a flowchart of a vehicle communication method according to an embodiment of the disclosure.

FIG. 3 is a flowchart of a vehicle communication method according to an embodiment of the disclosure. The vehicle communication method may be performed by an electronic device. The electronic device may be a user terminal, or may be a terminal device such as an on-board terminal, for example the user terminal 101 in FIG. 1. Referring to FIG. 3, the vehicle communication method includes at least operation S310 to operation S330, which are described in detail as follows:

In operation S310, Internet of Vehicles information transmitted by another device is received.

In an embodiment of the disclosure, the Internet of Vehicles information transmitted by another device can be Internet of Vehicles information transmitted by a V2X functional entity, or a V2P message transmitted by another on-board terminal (if the method shown in FIG. 3 is performed by the user terminal), or a V2V message (if the method shown in FIG. 3 is performed by the on-board terminal), or the like. The Internet of Vehicles information transmitted by another device includes driving assistance information, safety reminder information, and the like.

In operation S320, an information fusion and compression policy is determined based on at least one of the Internet of Vehicles information and state information of the electronic device.

In an embodiment of the disclosure, the information fusion and compression policy can be determined according to the received Internet of Vehicles information. Specifically, in a case that it is determined, according to the received Internet of Vehicles information, that a plurality of pieces of identical Internet of Vehicles information are received within a predetermined duration, a predetermined quantity of pieces of the Internet of Vehicles information is filtered out from the plurality of pieces of identical Internet of Vehicles information. The technical solution of this embodiment can avoid transmitting excessive identical Internet of Vehicles information to cause interruption to the user and power consumption of the terminal device.

In an embodiment of the disclosure, an information fusion and compression policy can be determined according to state information of the terminal device. Specifically, a movement speed of the terminal device can be determined according to the state information of the terminal device, and then a display frequency for the Internet of Vehicles information is determined based on the movement speed of the terminal device. The display frequency is positively correlated with the movement speed.

If a movement speed of a specified object is lower, a location relationship between the specified object and other surrounding objects changes more slowly. Therefore, the display frequency for the Internet of Vehicles information can be appropriately reduced to avoid excessively frequent display of certain types of Internet of Vehicles information to cause interruption to the user and increase power consumption of the terminal. On the contrary, if the movement speed of the specified object is higher, the location relationship between the specified object and other surrounding objects changes more quickly. Therefore, to ensure safety and provide driving assistance information in time, the display frequency for the Internet of Vehicles information can be increased.

In an embodiment of the disclosure, an information fusion and compression policy can alternatively be determined according to the received Internet of Vehicles information and state information of the terminal device. Specifically, a movement speed of a specified object can be determined according to state information of the specified object. If the movement speed of the specified object is relatively low, a display frequency of other Internet of Vehicles information than safety-related Internet of Vehicles information can be reduced, but it is still ensured that a display frequency of the safety-related Internet of Vehicles information is relatively high; and if the movement speed of the specified object is relatively high, the display frequency for the Internet of Vehicles information can be increased. Certainly, an upper limit of the display frequency can be set to ensure that the maximum value of the display frequency does not exceed the upper limit.

In an embodiment of the disclosure, the information fusion and compression policy for the specified object can be determined according to the state information and location information of the specified object. For example, a movement speed of the specified object can be determined according to the state information of the specified object. In a case that it is determined, according to the location information of the specified object, that the specified object is on a certain road section, a display frequency for Internet of Vehicles information can be reduced when the movement speed of the specified object is relatively low. In this embodiment, due to a relatively large volume of vehicles or pedestrians on certain road sections, even if the movement speed of the specified object is relatively low, to ensure safety and timeliness of driving assistance information, the display frequency for the Internet of Vehicles information cannot be reduced. Therefore, in a case that the specified object is on a certain road section, the display frequency for the Internet of Vehicles information can be reduced when the movement speed of the specified object is relatively low.

In an embodiment of the disclosure, the information fusion and compression policy for the specified object can be determined according to the received Internet of Vehicles information, and state information and location information of the specified object. For example, displaying other Internet of Vehicles information than safety-related Internet of Vehicles information is stopped in a case that it is determined, according to the movement speed of the specified object and the location information of the specified object, that the specified object is in a static state at a target location. For example, if a certain vehicle (that is, the specified object is a vehicle) is parked next to a safe road, displaying the Internet of Vehicles information such as the driving assistance information can be stopped. However, for the sake of safety, the safety-related Internet of Vehicles information, for example, information such as a distance between another vehicle or a pedestrian and the vehicle, and whether there is a security threat, can still be displayed.

In an embodiment of the disclosure, after displaying the other Internet of Vehicles information than the safety-related Internet of Vehicles information is stopped, the other Internet of Vehicles information is resumed to be displayed in a case that it is determined, according to the movement speed of the specified object and the location information of the specified object, that the specified object starts to move from the static state. The technical solution of this embodiment makes it possible to resume displaying the other Internet of Vehicles information after the vehicle continues to move, to assist the vehicle in safe driving.

Still referring to FIG. 3, in operation S330, the Internet of Vehicles information is displayed based on the information fusion and compression policy.

In an embodiment of the disclosure, as described in the foregoing embodiment, if the display frequency for the Internet of Vehicles information needs to be reduced, displaying the received Internet of Vehicles information based on the information fusion and compression policy is reducing the display frequency for the Internet of Vehicles information. If the display frequency for the Internet of Vehicles information needs to be increased, displaying the received Internet of Vehicles information based on the information fusion and compression policy is increasing the display frequency for the Internet of Vehicles information. If transmitting certain Internet of Vehicles information needs to be stopped, displaying the received Internet of Vehicles information based on the information fusion and compression policy is stopping displaying these Internet of Vehicles information. If the Internet of Vehicles information needs to be filtered, displaying the received Internet of Vehicles information based on the information fusion and compression policy is displaying the filtered Internet of Vehicles information.

In an embodiment of the disclosure, a presentation load level of the terminal device can be obtained, the presentation load level being used for representing a full load level of information presented by the terminal device, and then the information fusion and compression policy is adjusted based on the presentation load level, so that the quantity of pieces of Internet of Vehicles information displayed matches the presentation load level. The technical solution of this embodiment can adjust the information fusion and compression policy based on the full load level of the terminal device, to display as much Internet of Vehicles information as possible on the premise of meeting the full load level.

The technical solution of the foregoing embodiment of the disclosure is mainly to implement fusion and compression on the Internet of Vehicles information, to avoid excessive and frequent driving assistance information and safety reminder information to increase power consumption of the terminal device, which helps reduce interruption to the user and achieve energy saving.

Based on the system architecture shown in FIG. 1 and referring to the technical solutions of the foregoing embodiments, the V2X functional entity 104 deployed in the central cloud can implement the compression and fusion on the Internet of Vehicles information. In this case, the V2X functional entity 104 needs to grasp in real time location information and moving state information of objects (including pedestrians, vehicles, and the like) participating in the Internet of Vehicles communication, which can be achieved by using high-quality (low-latency and high-reliability) optical fibers or 4G/5G/B5G transmission links.

Specifically, the user terminal 101 can transmit location information and moving state information to the V2X functional entity 104 through the base station. The on-board terminal 102 can transmit location information, moving state information, and sensed location information and moving state information of other objects to the V2X functional entity 104 through the base station. The road side unit 103 can transmit the sensed location information and moving state information of surrounding objects to the V2X functional entity 104 through a wired link or a wireless link, so that the V2X functional entity 104 can determine the Internet of Vehicles information that needs to be transmitted and implement the compression and fusion on the Internet of Vehicles information. The V2X functional entity implements the compression and fusion on the Internet of Vehicles information, which can reduce calculation and processing load of the vehicle terminal or the user terminal, helping reduce the costs of the vehicle terminal and the user terminal, and can resolve the problem of coexistence of a terminal device that supports a 5G V2X function and a terminal device that does not support the 5G V2X function.

Figure 4:
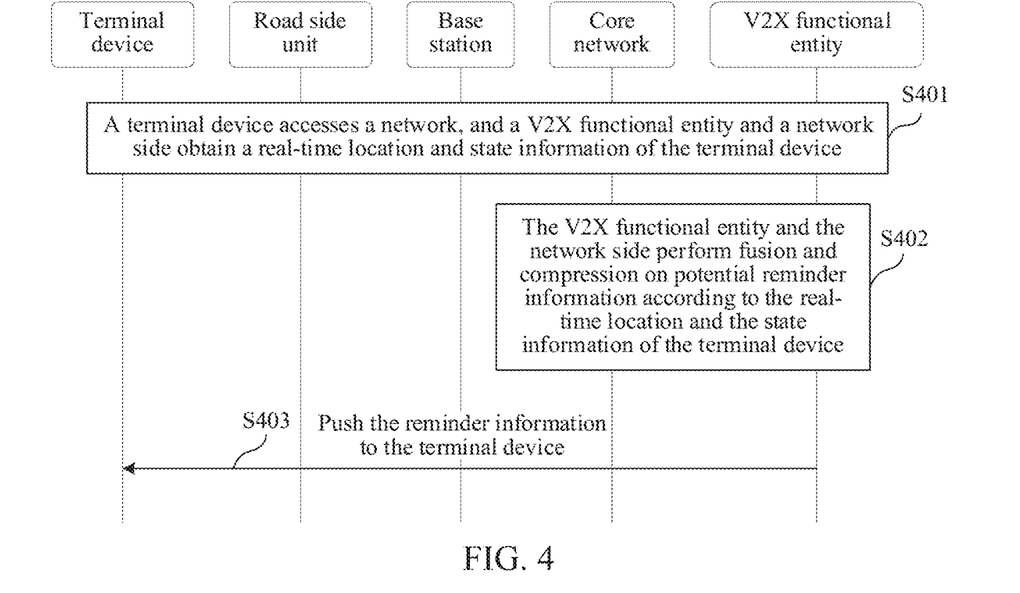
FIG. 4 is a flowchart of a method for compressing and fusing Internet of Vehicles information according to an embodiment of the disclosure.

Referring to FIG. 4, the specific process may include the following operations:

Operation S401. A terminal device accesses a network, and a V2X functional entity and a network side obtain a real-time location and state information of the terminal device. In this case, the network side is a core network.

Operation S402. The V2X functional entity and the network side perform fusion and compression on potential reminder information according to the real-time location and the state information of the terminal device. The V2X functional entity and the network side can obtain global information of a plurality of objects (including vehicles, pedestrians, and the like) within a specific range, and then can perform the fusion and compression on the potential reminder information.

Operation S403. The V2X functional entity pushes the reminder information to the terminal device.

Figure 5:
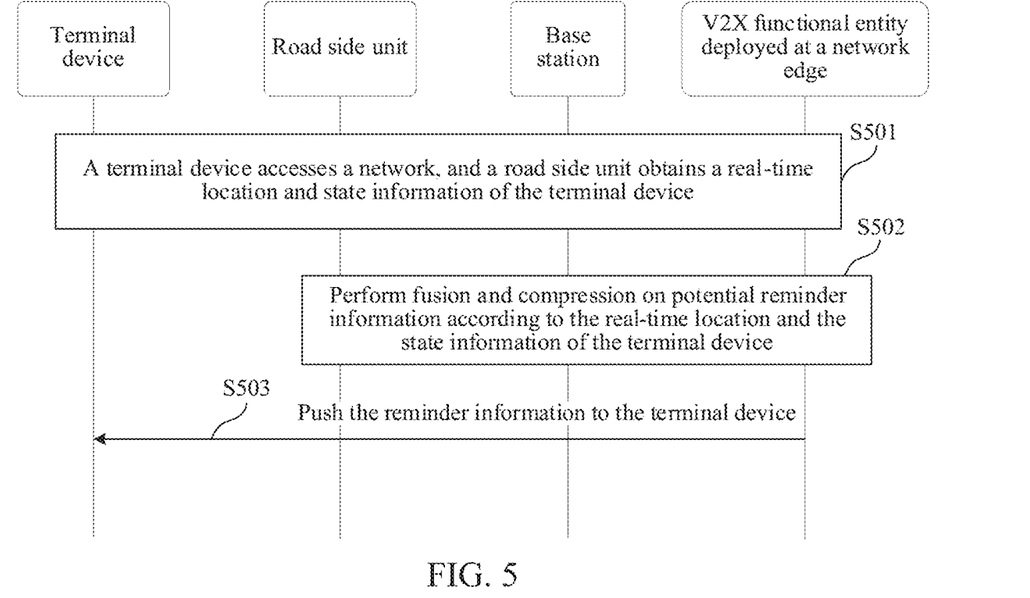
FIG. 5 is a flowchart of a method for compressing and fusing Internet of Vehicles information according to an embodiment of the disclosure.

In an embodiment of the disclosure, a road side unit and a V2X functional entity deployed at a network edge can also implement the compression and fusion on the Internet of Vehicles information. Because the road side unit can obtain global information of a plurality of vehicles and pedestrians within a specific range, after performing the compression and fusion, the road side unit and the V2X functional entity can directly transmit the compressed and fused Internet of Vehicles information to certain objects (including a user terminal and an on-board terminal), or can transmit the compressed and fused Internet of Vehicles information to the central cloud. The road side unit and the V2X functional entity implement the compression and fusion on the Internet of Vehicles information, which can also reduce calculation and processing load of the vehicle terminal or the user terminal, helping reduce the costs of the vehicle terminal and the user terminal, and can resolve the problem of coexistence of a terminal device that supports a 5G V2X function and a traditional terminal device that does not support the 5G V2X function.

Referring to FIG. 5, the specific process may include the following operations:

Operation S501. A terminal device accesses a network, and a road side unit obtains a real-time location and state information of the terminal device.

Operation S502. The road side unit and a V2X functional entity deployed at a network edge perform fusion and compression on potential reminder information according to the real-time location and the state information of the terminal device. The road side unit and the V2X functional entity can obtain global information of a plurality of objects (including vehicles, pedestrians, and the like.) within a specific range, and then can perform the fusion and compression on the potential reminder information. Specifically, the road side unit can transmit the obtained global information to the V2X functional entity, and the V2X functional entity implements the fusion and compression on the potential reminder information.

Operation S503. The V2X functional entity pushes the reminder information to the terminal device.

Figure 6:
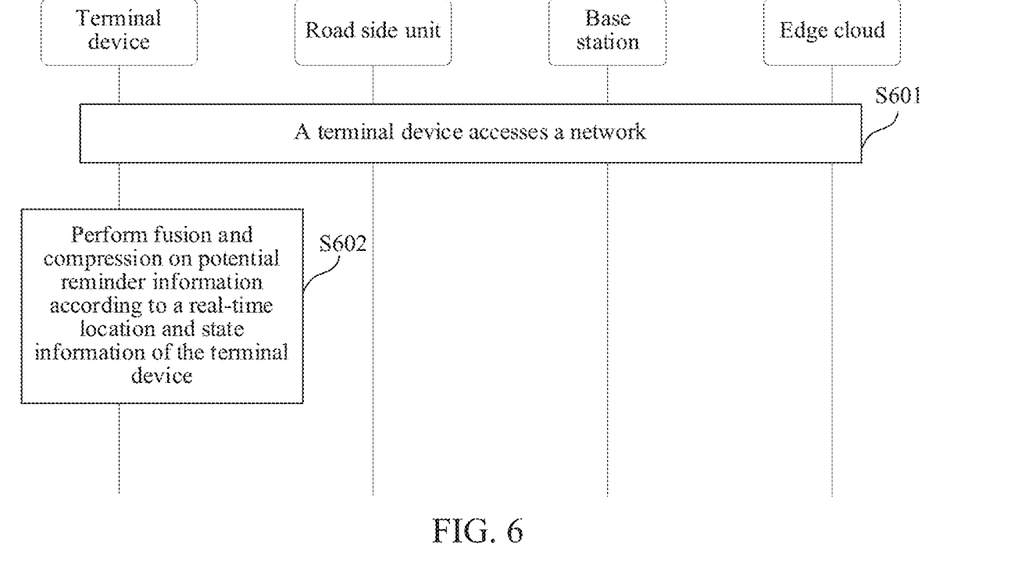
FIG. 6 is a flowchart of a method for compressing and fusing Internet of Vehicles information according to an embodiment of the disclosure.

In an embodiment of the disclosure, the terminal device (including the user terminal 101 and the on-board terminal 102) can also implement the compression and fusion on the Internet of Vehicles information. A basic principle is that after receiving the Internet of Vehicles information, the terminal device can perform analysis to determine whether the received Internet of Vehicles information is redundant, and if yes, the Internet of Vehicles information is not displayed.

A terminal device side implements compression and fusion on the Internet of Vehicles information, which can be used as the last "barrier" for processing redundant information. However, the terminal device side needs to obtain information and states of traffic participants in a certain region, and also needs to maintain a state of the information, so as to achieve compression and filtering. The compression and fusion on information on the terminal device side also includes: For a reminder frequency of the same information, if a lower frequency can meet the needs, there is no need to use a higher presentation frequency. Therefore, the presentation frequency of the same information can be reduced, for example, some of the same information can be filtered out within a period of time, and only part of the information is displayed.

Referring to FIG. 6, the specific process may include the following operations:

Operation S601. A terminal device accesses a network, and specifically can access an edge cloud through a base station.

Operation S602. The terminal device performs fusion and compression on potential reminder information according to a real-time location and state information.

In an embodiment of the disclosure, manufacturers or service providers (including vehicle manufacturers, road operators, Internet service providers, and the like) of the terminal device can perform customization or policy configuration by using an information compression and fusion function to set an information presentation manner of the terminal device, so as to implement hierarchical and classified customization of information reminders and safety warnings. Specifically, habits of the user (such as user portrait information) and the user's value recognition of different reminder information (the user's feedback information on pushed reminder information) can be comprehensively taken into consideration in the hierarchical and classified customization, where the habits or the value recognition of the user can be dynamically adjusted through statistical information acquired on a terminal device, an edge cloud, or a central cloud (the statistical information may include the user's feedback information on the pushed reminder information).

In an embodiment of the disclosure, when compression and fusion are performed on the Internet of Vehicles information, it is necessary to ensure the accuracy and non-omission of the compressed and fused Internet of Vehicles information. That is, it is to avoid over-compression and fusion leading to the loss of reminders of some information, and avoid a low degree of compression and fusion leading to over-reminding the user to increase power consumption of the terminal device.

In an embodiment of the disclosure, properly designing a graphical user interface (GUI) of the terminal device can implement high-efficiency display of information, such as reducing display of text, and using more graphics and voice. Specifically, GUI presentation can define a parameter, such as a presentation load level. The indicator reflects a full load level of information presented on a vehicle terminal or a user terminal. The indicator is related to GUI design, and a good GUI design can display more information under the same indicator of the presentation load level. Therefore, the presentation load level can be used as a feedback indicator to trigger or adjust the compression and fusion function of the Internet of Vehicles information, so that the quantity of pieces of the Internet of Vehicles information that the terminal device needs to display can match the presentation load level.

The technical solutions of the embodiments of the disclosure can implement fusion and compression on a V2X reminder message, thereby reducing power consumption of the terminal device in a V2P scenario, that is, the quantity of V2P messages received by the terminal device can be reduced, avoiding unnecessary interruption to the user and excessive power consumption of the terminal. Certainly, it is also possible to implement the fusion and compression on the V2X reminder message on a vehicle side for man-machine interaction and user experience on the vehicle side, avoiding excessive interruption to the driving of the driver.

The following describes apparatus embodiments of the disclosure, and the apparatus embodiments may be used for performing the vehicle communication method in the foregoing embodiments of the disclosure. For details not disclosed in the apparatus embodiments of the disclosure, refer to the foregoing vehicle communication method embodiments of the disclosure.

Figure 7:
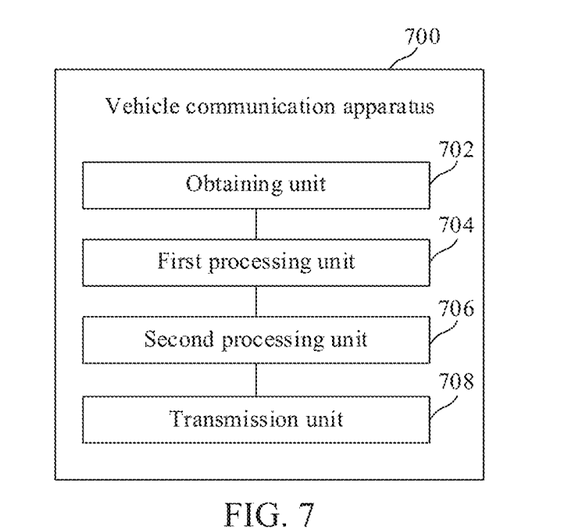
FIG. 7 is a block diagram of a vehicle communication apparatus according to an embodiment of the disclosure.

FIG. 7 is a block diagram of a vehicle communication apparatus according to an embodiment of the disclosure. The vehicle communication apparatus may be disposed in an electronic device, for example, disposed in a V2X functional entity, where the V2X functional entity may be disposed in a central cloud or an edge cloud.

Referring to FIG. 7, the vehicle communication apparatus 700 according to an embodiment of the disclosure includes: an obtaining unit 702, a first processing unit 704, a second processing unit 706, and a transmission unit 708.

The obtaining unit 702 is configured to obtain location information and state information of a plurality of objects participating in Internet of Vehicles communication. The first processing unit 704 is configured to determine, according to the location information and the state information of the plurality of objects, Internet of Vehicles information that needs to be transmitted to a specified object. The second processing unit 706 is configured to determine an information fusion and compression policy for the specified object based on at least one of the Internet of Vehicles information and state information of the specified object. The transmission unit 708 is configured to transmit the Internet of Vehicles information to the specified object based on the information fusion and compression policy.

In some embodiments of the disclosure, based on the foregoing solution, the obtaining unit 702 obtains the location information and the state information of the plurality of objects participating in the Internet of Vehicles communication, including at least one of the following: obtaining location information and state information transmitted by a plurality of terminal devices; obtaining location information and state information of other objects sensed by the plurality of terminal devices; and obtaining location information and state information of objects acquired by a plurality of road side units.

In some embodiments of the disclosure, based on the foregoing solution, the second processing unit 706 is configured to: determine a movement speed of the specified object according to the state information of the specified object; and determine, based on the movement speed of the specified object, a frequency of transmitting the Internet of Vehicles information to the specified object.

In some embodiments of the disclosure, based on the foregoing solution, the second processing unit 706 is configured to stop transmitting other Internet of Vehicles information than safety-related Internet of Vehicles information to the specified object in a case that it is determined, according to the movement speed of the specified object and location information of the specified object, that the specified object is in a static state at a target location.

In some embodiments of the disclosure, based on the foregoing solution, the second processing unit 706 is further configured to resume transmitting the other Internet of Vehicles information to the specified object in a case that it is determined, according to the movement speed of the specified object and the location information of the specified object, that the specified object starts to move from the static state.

In some embodiments of the disclosure, based on the foregoing solution, the second processing unit 706 is configured to filter out, in a case that it is determined, according to the Internet of Vehicles information, that there are a plurality of pieces of identical Internet of Vehicles information within a predetermined duration, a predetermined quantity of pieces of Internet of Vehicles information from the plurality of pieces of identical Internet of Vehicles information.

In some embodiments of the disclosure, based on the foregoing solution, the second processing unit 706 is configured to adjust the information fusion and compression policy through at least one of the following information: a user portrait corresponding to the specified object, approval information fed back by the specified object for the Internet of Vehicles information, and importance of the Internet of Vehicles information.

Figure 8:
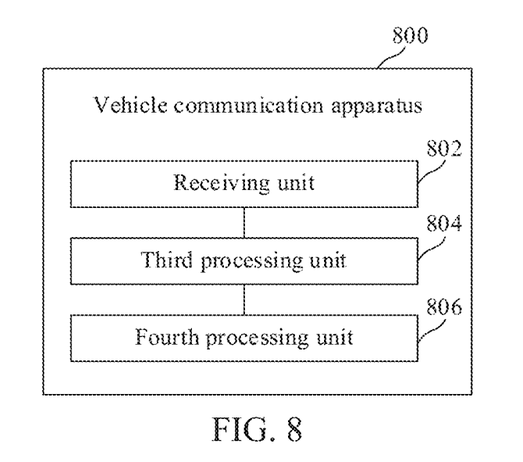
FIG. 8 is a block diagram of a vehicle communication apparatus according to an embodiment of the disclosure.

FIG. 8 is a block diagram of a vehicle communication apparatus according to an embodiment of the disclosure. The vehicle communication apparatus may be disposed in an electronic device, for example, a terminal device.

Referring to FIG. 8, the vehicle communication apparatus 800 according to an embodiment of the disclosure includes: a receiving unit 802, a third processing unit 804, and a fourth processing unit 806.

The receiving unit 802 is configured to receive Internet of Vehicles information transmitted by another device. The third processing unit 804 is configured to determine an information fusion and compression policy based on at least one of the Internet of Vehicles information and state information of an electronic device. The fourth processing unit 806 is configured to display the Internet of Vehicles information based on the information fusion and compression policy.

In some embodiments of the disclosure, based on the foregoing solution, the third processing unit 804 is configured to filter out, in a case that it is determined that a plurality of pieces of identical Internet of Vehicles information are received within a predetermined duration according to the Internet of Vehicles information, a predetermined quantity of pieces of Internet of Vehicles information from the plurality of pieces of identical Internet of Vehicles information.

In some embodiments of the disclosure, based on the foregoing solution, the third processing unit 804 is configured to: determine a movement speed of the terminal device according to the state information; and determine a display frequency for the Internet of Vehicles information based on the movement speed of the terminal device.

In some embodiments of the disclosure, based on the foregoing solution, the third processing unit 804 is further configured to: obtain a presentation load level of the electronic device, the presentation load level being used for representing a full load level of information presented by the electronic device; and adjust the information fusion and compression policy based on the presentation load level, so that the amount of the displayed Internet of Vehicles information matches the presentation load level.

Figure 9:
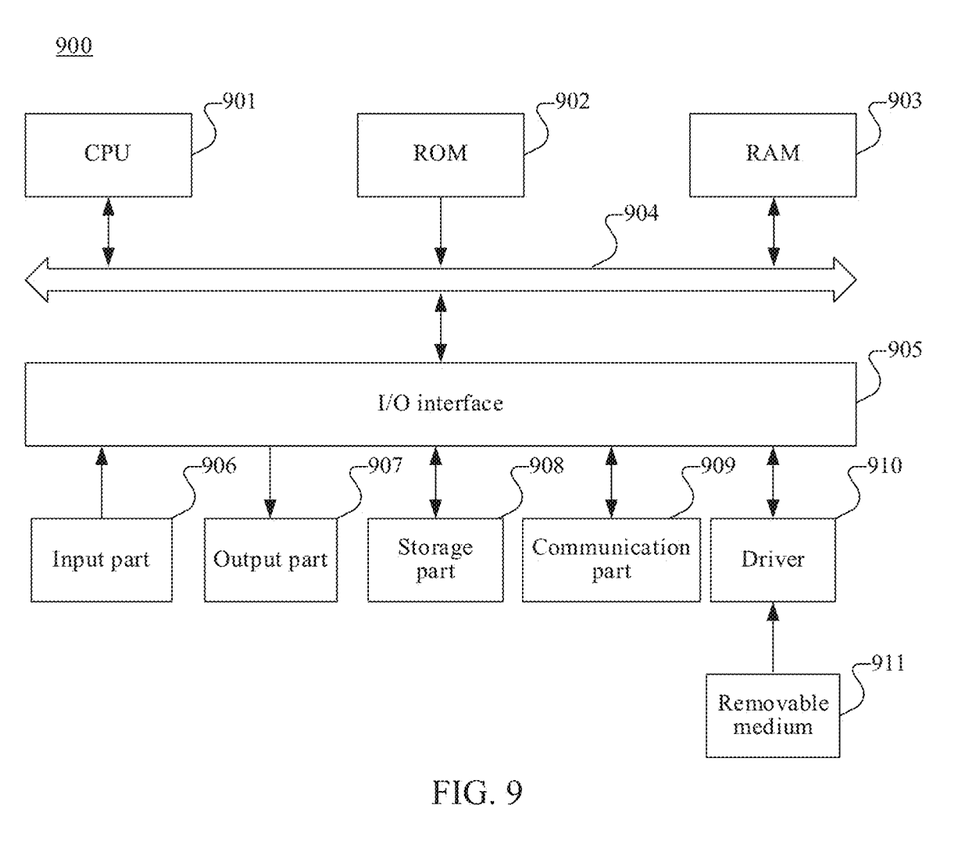
FIG. 9 is a schematic structural diagram of an electronic device adapted to implement the embodiments of the disclosure.

FIG. 9 is a schematic structural diagram of an electronic device adapted to implement the embodiments of the disclosure.

The electronic device 900 shown in FIG. 9 is merely an example, and does not constitute any limitation on functions and use ranges of the embodiments of the disclosure.

As shown in FIG. 9, the electronic device 900 includes a central processing unit (CPU) 901, which may perform various suitable actions and processing based on a program stored in a read-only memory (ROM) 902 or a program loaded from a storage part 908 into a random access memory (RAM) 903, for example, perform the method described in the foregoing embodiments. The RAM 903 further stores various programs and data required for system operations. The CPU 901, the ROM 902, and the RAM 903 are connected to each other by using a bus 904. An input/output (I/O) interface 905 is also connected to the bus 904.

The following components are connected to the I/O interface 905: an input part 906 including a keyboard, a mouse, and the like; an output part 907 including a cathode ray tube (CRT), a liquid crystal display (LCD), a speaker, and the like; a storage part 908 including a hard disk and the like; and a communication part 909 including a network interface card such as a local area network (LAN) card, a modem, and the like. The communication part 909 performs communication processing through a network such as the Internet. A driver 910 is also connected to the I/O interface 905 as required. A removable medium 911, such as a magnetic disk, an optical disc, a magneto-optical disk, or a semiconductor memory, is installed on the drive 910 as required, so that a computer program read from the removable medium is installed into the storage part 908 as required.

Particularly, according to an embodiment of the disclosure, the processes described above by referring to the flowcharts may be implemented as computer software programs. For example, an embodiment of the disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 909, and/or installed from the removable medium 911. When the computer program is executed by the CPU 901, the various functions defined in the system of the disclosure are executed.

The computer-readable medium shown in the embodiments of the disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In the disclosure, the computer-readable storage medium may be any tangible medium containing or storing a program, and the program may be used by or used in combination with an instruction execution system, apparatus, or device. In the disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may transmit, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing specified logic functions. In some embodiments used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units or code described in the embodiments of the disclosure may be implemented in a software manner, or may be implemented in a hardware manner, and the unit described can also be set in a processor. Names of the units do not constitute a limitation on the units in a specific case.

According to another aspect, the disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the embodiments of the disclosure, the features and functions of two or more modules or units or code described above may be specifically implemented in one module or unit. Conversely, features and functions of one module or unit or code described above may be further divided into a plurality of modules or units or code for embodiment.

According to the foregoing descriptions of the embodiments, a person skilled in the art may readily understand that the exemplary embodiments described herein may be implemented by using software, or may be implemented by combining software and necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the embodiments of the disclosure.

After considering the specification and practicing the disclosed embodiments, a person skilled in the art may easily conceive of other embodiments of the disclosure. The disclosure is intended to cover any variations, uses, or adaptive changes of the disclosure following the general principles of the disclosure, and includes well-known knowledge and conventional technical means in the art and undisclosed in the disclosure.

It is to be understood that the disclosure is not limited to the precise structures described above and shown in the accompanying drawings, and various modifications and changes may be made without departing from the scope of the disclosure. The scope of the disclosure is subject only to the appended claims.

What is claimed is:

1. A vehicle communication method, performed by an electronic device, the method comprising:

obtaining real time location information and state information of a plurality of objects participating in Internet of Vehicles communication;

determining, in real time, Internet of Vehicles information that needs to be transmitted to a specified object based on the real time location information and the state information of the plurality of objects;

determining an information fusion and compression policy for the specified object based on at least one of the Internet of Vehicles information and state information of the specified object;

transmitting the Internet of Vehicles information to the specified object in accordance with the information fusion and compression policy;

automatically adjusting the information fusion and compression policy according to the Internet of Vehicles information determined in real time, and transmitting the Internet of Vehicles information to the specified object in accordance with the adjusted information fusion and compression policy;

wherein determining the information fusion and compression policy for the specified object based on at least one of the Internet of Vehicles information and state information of the specified object comprises:

determining a movement speed of the specified object according to the state information of the specified object; and determining, based on the movement speed of the specified object, the frequency of transmitting the Internet of Vehicles information to the specified object, and wherein determining, based on the movement speed of the specified object, the frequency of transmitting the Internet of Vehicles information to the specified object comprises:

stopping transmitting other Internet of Vehicles information than safety-related Internet of Vehicles information to the specified object and still transmitting the safety-related Internet of Vehicles information to the specified object based on a determination that, according to the movement speed of the specified object and location information of the specified object, the specified object is in a static state at a target location.

2. The vehicle communication method according to claim 1, wherein the obtaining comprises:

obtaining location information and state information transmitted by a plurality of terminal devices.

3. The vehicle communication method according to claim 1, wherein the obtaining comprises:

obtaining location information and state information of other objects sensed by a plurality of terminal devices.

4. The vehicle communication method according to claim 1, wherein the obtaining comprises:

obtaining location information and state information of objects acquired by a plurality of road side units.

5. The vehicle communication method according to claim 1, further comprising:

resuming transmitting the other Internet of Vehicles information to the specified object in a case that it is determined, according to the movement speed of the specified object and the location information of the specified object, that the specified object starts to move from the static state.

6. The vehicle communication method according to claim 1, wherein determining the information fusion and compression policy for the specified object based on at least one of the Internet of Vehicles information and state information of the specified object further comprises:

filtering out, in a case that it is determined, according to the Internet of Vehicles information, that there are a plurality of pieces of identical Internet of Vehicles information within a predetermined duration, a predetermined quantity of pieces of Internet of Vehicles information from the plurality of pieces of identical Internet of Vehicles information.

7. The vehicle communication method according to claim 1, wherein the automatically adjusting the information fusion and compression policy comprises:

adjusting the information fusion and compression policy through at least one of the following information: a user portrait corresponding to the specified object, approval information fed back by the specified object for the Internet of Vehicles information, and importance of the Internet of Vehicles information.

8. A vehicle communication apparatus, comprising:

at least one memory configured to store program code; and at least one processor configured to read the program code and operate as instructed by the program code, the program code comprising:

obtaining code configured to cause the at least one processor to obtain real time location information and state information of a plurality of objects participating in Internet of Vehicles communication;

first processing code configured to cause the at least one processor to determine, in real time, Internet of Vehicles information that needs to be transmitted to a specified object based on the real time location information and the state information of the plurality of objects;

second processing code configured to cause the at least one processor to determine an information fusion and compression policy for the specified object based on at least one of the Internet of Vehicles information and state information of the specified object; and transmission code configured to cause the at least one processor to transmit the Internet of Vehicles information to the specified object in accordance with the information fusion and compression policy, wherein the second processing code is further configured to cause the at least one processor to automatically adjusting the information fusion and compression policy according to the Internet of Vehicles information determined in real time; and the transmission code is further configured to cause the at least one processor to transmit the Internet of Vehicles information to the specified object in accordance with the adjusted information fusion and compression policy, wherein the second processing code is further configured to cause the at least one processor to:

determine a movement speed of the specified object according to the state information of the specified object; and determine, based on the movement speed of the specified object, a frequency of transmitting the Internet of Vehicles information to the specified object, and stop transmitting other Internet of Vehicles information than safety-related Internet of Vehicles information to the specified object and still transmit the safety-related Internet of Vehicles information to the specified object based on a determination that, according to the movement speed of the specified object and location information of the specified object, the specified object is in a static state at a target location.

9. The vehicle communication apparatus according to claim 8, wherein the obtaining code is further configured to cause the at least one processor to:
obtain location information and state information transmitted by a plurality of terminal devices.

10. The vehicle communication apparatus according to claim 8, wherein the obtaining code is further configured to cause the at least one processor to:
obtain location information and state information of other objects sensed by a plurality of terminal devices.

11. The vehicle communication apparatus according to claim 8, wherein the obtaining code is further configured to cause the at least one processor to:
obtain location information and state information of objects acquired by a plurality of road side units.

12. The vehicle communication apparatus according to claim 8, wherein the second processing code is further configured to cause the at least one processor to:
resume transmitting the other Internet of Vehicles information to the specified object in a case that it is determined, according to the movement speed of the specified object and the location information of the specified object, that the specified object starts to move from the static state.

13. The vehicle communication apparatus according to claim 8, wherein the second processing code is further configured to cause the at least one processor to:
filter out, in a case that it is determined, according to the Internet of Vehicles information, that there are a plurality of pieces of identical Internet of Vehicles information within a predetermined duration, a predetermined quantity of pieces of Internet of Vehicles information from the plurality of pieces of identical Internet of Vehicles information.

14. The vehicle communication apparatus according to claim 8, wherein the second processing code is further configured to cause the at least one processor to:
automatically adjust the information fusion and compression policy through at least one of the following information: a user portrait corresponding to the specified object, approval information fed back by the specified object for the Internet of Vehicles information, and importance of the Internet of Vehicles information.

15. A non-transitory computer-readable storage medium, storing a computer program code that when executed by at least one processor causes the at least one processor to:
obtain real time location information and state information of a plurality of objects participating in Internet of Vehicles communication;
determine, in real time, Internet of Vehicles information that needs to be transmitted to a specified object based on the real time location information and the state information of the plurality of objects;
determine an information fusion and compression policy for the specified object based on at least one of the Internet of Vehicles information and state information of the specified object;
transmit the Internet of Vehicles information to the specified object in accordance with the information fusion and compression policy;
automatically adjust the information fusion and compression policy according to the Internet of Vehicles information determined in real time, and
transmit the Internet of Vehicles information to the specified object in accordance with the adjusted information fusion and compression policy,
wherein the determine an information fusion and compression policy for the specified object based on at least one of the Internet of Vehicles information and state information of the specified object comprises:
determining a movement speed of the specified object according to the state information of the specified object, and
determining, based on the movement speed of the specified object, a frequency of transmitting the Internet of Vehicles information to the specified object; and
wherein the determine, based on the movement speed of the specified object, the frequency of transmitting the Internet of Vehicles information to the specified object comprises:
stopping transmitting other Internet of Vehicles information than safety-related Internet of Vehicles information to the specified object and still transmitting the safety-related Internet of Vehicles information to the specified object based on a determination that, according to the movement speed of the specified object and location information of the specified object, the specified object is in a static state at a target location.

16. The non-transitory computer-readable storage medium according to claim 15, wherein the obtain location information and state information of a plurality of objects participating in Internet of Vehicles communication comprises: obtaining location information and state information transmitted by a plurality of terminal devices.

* * * * *